S. P. GROOCOCK.

TESSELLATED FLOOR.

No. 7,294. Reissued Sept. 5, 1876.

WITNESSES:

W. W. Hollingsworth

Solon D. Neimon

INVENTOR:

S. P. Groocock

BY

Munn & Co

ATTORNEYS.

N. PETERS, PHOTO-LITHOGRAPHER, WASHINGTON, D. C.

UNITED STATES PATENT OFFICE.

SAMUEL P. GROOCOCK, OF NEW YORK, N. Y.

IMPROVEMENT IN TESSELLATED FLOORS.

Specification forming part of Letters Patent No. 178,141, dated May 30, 1876; reissue No. 7,294, dated September 5, 1876; application filed August 22, 1876.

DIVISION B.

*To all whom it may concern:*

Be it known that I, SAMUEL P. GROOCOCK, of the city, county, and State of New York, have invented a new and useful Improvement in Tessellated Floors; and I do hereby declare that the following is a full, clear, and exact description of the same:

The species of ornamental flooring produced by the art of marquetry, and long in vogue in Europe, has begun to be adopted in the construction and repair of the better class of dwellings in the larger cities of this country. In order to give the tessellated flooring the desired firmness, solidity, and permanency, and at the same time avoid the use of thick blocks or pieces, which would greatly increase its cost, it has been the practice to connect the pieces by tongue and groove, and to lay them upon a foundation composed of numerous wooden strips or timbers, or, more commonly, of a plastic cementitious material. The various imperfections or objectionable features of these and similar modes of laying marquetry-floors have led to the development of my present invention, which consists in forming composite flooring blocks or sections of a number of wooden pieces of the desired or requisite sizes, shapes, and colors, and firmly uniting them by dovetail-strips or equivalent means, as hereinafter described. A flooring-block so made up is comparatively light, yet very strong and rigid, and not liable to warp under the conditions to which tessellated flooring is ordinarily subjected.

The block is produced at much less cost than those the pieces of which are joined by a lateral tongue and groove, and it has also a deeper wearing-surface, since the grooves are formed, and the connecting-strips inserted, on the under side of the block.

Figure 1:
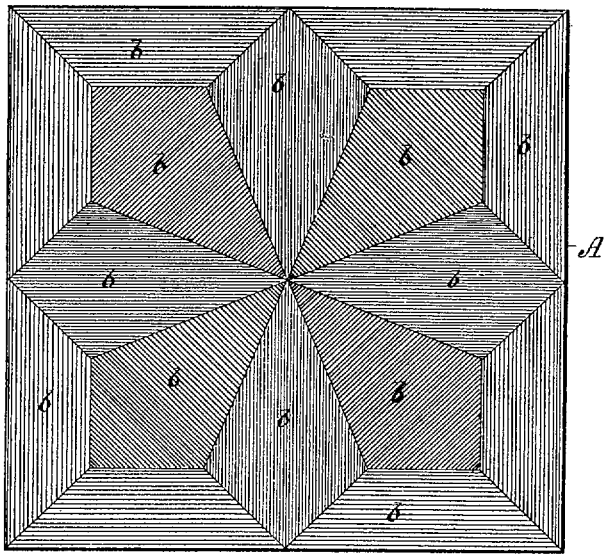
Figure 2:
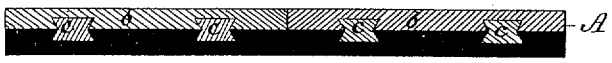

In the accompanying drawing, forming part of this specification, Figure 1 is a plan view of the face side of the flooring-block; Fig. 2, a cross-section.

A indicates the flooring-block or section, composed of pieces of various sizes, forms, and colors. In constructing the same, I first cut out the several pieces *b* in the ordinary manner; but in place of providing them with the ordinary tongue and groove on the edge, which considerably increases the cost of the flooring, I simply glue the sides of the pieces *b* together, and then, by aid of suitable machinery, I cut one or more dovetail grooves across the entire composite block or section A at one operation. Dovetail-strips *c* are then driven into the grooves to connect the pieces firmly together, and thus form a rigid, solid block which may be easily handled, transported, and laid, and is not liable to warp. When the strips project from the surface of the block, as shown, they constitute a means of connection for an asphalt backing, *d*.

In some instances I may substitute a plain or square-angled groove in place of a dovetail. To form the tessellated or marquetry flooring complete, the composite blocks A are laid upon a suitable foundation, preferably upon a bed of plastic cementitious material.

Having thus described my invention, what I claim as new is—

The composite block A for marquetry-flooring, formed of pieces arranged in a suitable design or pattern, and connected by strips *c* inserted in grooves formed in the under side thereof, as shown and described.

SAML. P. GROOCOCK.

Witnesses:

S. B. GOODALE,

S. C. KEMON.